United States Patent
Shinomura et al.

[11] Patent Number: 6,108,709
[45] Date of Patent: Aug. 22, 2000

[54] SYSTEM FOR SENDING AN E-MAIL MESSAGE TO A FIRST TYPE OF TERMINAL BASED UPON CONTENT THEREOF AND SELECTED CONDITIONS AND SELECTIVELY FORWARDING IT TO A SECOND TYPE OF TERMINAL

[75] Inventors: Masahiko Shinomura, Machida; Takashi Oshiyama, Fujisawa, both of Japan

[73] Assignee: International Business Machines Corp., Armonk, N.Y.

[21] Appl. No.: 09/025,902

[22] Filed: Feb. 19, 1998

[30] Foreign Application Priority Data

Feb. 26, 1997 [JP] Japan .................................. 9-042504

[51] Int. Cl.⁷ .............................. G06F 13/38; G06F 17/30
[52] U.S. Cl. ...................... 709/239; 709/228; 709/238; 710/15
[58] Field of Search .................. 340/825.44, 825.48, 340/825.27; 455/413; 709/227, 228, 238, 239; 710/15, 62

[56] References Cited

U.S. PATENT DOCUMENTS

| | | | |
|---|---|---|---|
| 4,554,418 | 11/1985 | Toy | 179/2 DP |
| 4,814,763 | 3/1989 | Nelson et al. | 340/825.44 |
| 4,962,532 | 10/1990 | Kasiraj et al. | |
| 5,237,321 | 8/1993 | Oliwa | 340/825.44 |
| 5,418,835 | 5/1995 | Frohman et al. | 455/413 |
| 5,621,722 | 4/1997 | Edmaier et al. | 370/390 |

FOREIGN PATENT DOCUMENTS

| | | | |
|---|---|---|---|
| 0514360 | 11/1992 | European Pat. Off. | H04Q 7/04 |
| 2320659 | 6/1998 | United Kingdom | H04Q 7/38 |

OTHER PUBLICATIONS

"Method for Communicating Information to and for Traveling Users", IBM TDB vol. 37, No. 2A, pp. 109–112, Feb. 1994.

"Allowing an Alternate Recipient to Receive a Distribution", IBM TDB p. 273, Feb. 1990.

"Receipient–Based Alternate Media Reply–by Mechanism", IBM TDB, pp. 673–674, Jan. 1994.

*Primary Examiner*—Thomas C. Lee
*Assistant Examiner*—A. Elamin
*Attorney, Agent, or Firm*—A. Bruce Clay; Myers, Bigel, Sibley & Sajovec

[57] ABSTRACT

A superior data sending apparatus has an alternate forwarding function for the exchange of data by different receiving terminal models. A sender attempts to send a message to one of several receiving terminals carried by a receiver. When communication is not established under a predetermined condition, e.g., within a predetermined period of time, the sender then tries alternate message forwarding to another receiving terminal carried by the same receiver. Since alternate forwarding is automatically performed in accordance with alternate forwarding information registered in advance, no effort is required of a user. Even when the received data processing capability (e.g., the input available character size) differs between the originally designated receiving terminal and the alternate receiving terminal, the system changes the format of the contents of message or the size of the message to one that is adequate, so that an alternate, seamless forwarding can be implemented.

16 Claims, 11 Drawing Sheets

| Tools (T)            |          |
|----------------------|----------|
| Distribution (D)     | Ctrl+M   |
| Address Book (A) ... | Ctrl+B   |
| Search (F) ...       |          |
| Change tool bar (T) ... |       |
| Option (O) ...       |          |

FIG. 7

| New (N)              |          |
|----------------------|----------|
| New message (N)      | Ctrl+N   |
| Return to sender (R) | Ctrl+R   |
| Return to all (A)    | Ctrl+A   |
| Forward (F)          | Ctrl+F   |

FIG. 8

| Window (W) |
|---|
| Cascade (C) |
| Display vertically (V) |
| Display horizontally (H) |
| Arrange icons (A) |
| Display behind (B) |
| ✓ 1. Sending list |
|    2. Reception list |
|    3. Trash box |
|    4. Mail box (standard) |

FIG. 9

| Help (H) |
|---|
| InfoMail help topic (E) ... |
| Version data (A) ... |

FIG. 10

| I | STS | Sender | Address | Subject | Sending date |

| File (F) | |
|---|---|
| Entry (E) ... | Ctrl+E |
| Change name (N) ... | Ctrl+N |
| Delete (D) | Ctrl+D |
| Property (R) ... | |
| Close (C) | Alt+F4 |

| Tools (T) |
|---|
| Change tool bar (T) ... |
| Option (O) ... |

| New (N) | |
|---|---|
| Make new message (N) ... | Ctrl+N |

| Help (H) |
|---|
| InfoMail help topic (E) ... |
| Version data (A) ... |

| File (F) | |
|---|---|
| Read (G) ... | Ctrl+G |
| Save as (A) ... | |
| Print (P) | Ctrl+P |
| Property (R) ... | |
| Close (C) | Alt+F4 |

FIG. 16A

| Edit (E) | |
|---|---|
| Cut (T) | Ctrl+X |
| Copy (C) | Ctrl+C |
| Paste (P) | Ctrl+V |
| Select all (A) | Ctrl+Y |

FIG. 16B

| Tools (T) | |
|---|---|
| Address book (A) ... | Ctrl+B |
| Change tool bar (T) ... | |
| Option (O) ... | |

FIG. 16C

| Send (S) | |
|---|---|
| No delay (N) | Ctrl+S |
| Sending queue (Q) | Ctrl+Q |
| Designate time (T) | Ctrl+T |
| Keep (K) | Ctrl+K |

FIG. 16D

| Help (H) |
|---|
| InfoMail help topic (E) ... |
| Version data (A) ... |

FIG. 16E

SYSTEM FOR SENDING AN E-MAIL MESSAGE TO A FIRST TYPE OF TERMINAL BASED UPON CONTENT THEREOF AND SELECTED CONDITIONS AND SELECTIVELY FORWARDING IT TO A SECOND TYPE OF TERMINAL

FIELD OF THE INVENTION

The present invention relates in general to a method and apparatus for sending data with an alternate forwarding function. More specifically, the present invention pertains to a data sending apparatus that has an alternate forwarding function, for different models of receiving terminals having different reception capabilities.

BACKGROUND OF THE INVENTION

In accordance with recent technical developments, various types of personal computers (PCS), such as desktop, tower and notebook types, have been developed and are popular. Lately, the application fields for PCS have been expanded.

For example, when a PC is equipped with a modem, the PC can be connected to a public telephone line. When a communication adaptor card (a TOKENRING™ card or an ETHERNET™ card) is installed into a PC, the PC can be connected to a local area network (LAN). Furthermore, since a LAN can be connected to the Internet via a router, recently, the PCs tend to be installed in network environments for use as information communication terminals.

The exchange of messages, such as the exchange of "e-mail", is the primary function of a PC in a network environment. An e-mail service system ensures the transfer of data and messages, and for international use, the charges are lower than those for telexes. Since only a person having a designated address (ID) can know of the existence of a message and its contents, e-mail can serve as a private mail service.

The types and forms of data communication terminals vary. For example, in addition to the conventional telephones connected to public telephone lines, various types of radio communication terminals that do not require cable connections have appeared. Radio communication terminals in current use are, for example, portable digital telephones (so-called cellular phones), portable analog telephones, PHS (Personal Handyphone System) phones, and pagers. However, the performances and features, i.e., the communication capabilities, of these terminals differ. For example, although the reception areas for PHS phones are smaller than those for portable telephones, no restrictions are placed on the allocation of frequencies for PHS phones, for which, as a result, purchase prices and communication fees are low. Both portable telephones and PHS phones, however, permit users to employ not only voice communication but also to receive transmissions of several Kilobytes of text data at a time. Whereas pagers, compared to these other radio communication terminals have considerably larger reception areas, have no transmission functions and can accept only about ten bytes of data at a time, and have, therefore, rather inferior data processing capabilities. Thus, by taking the differences in the communication capabilities into account, it can be understood that a single user may own and carry a number of different radio communication terminals and use them in accordance with the location.

Conventionally, e-mail systems have been employed as data exchange systems for transferring data between PCs installed in offices. Lately, however, the need to send messages to communication terminals in mobile environments has increased; as when, for example, a worker (using a PC) resident in an office must send an instruction or a message to another worker (carrying a PHS phone or a pager) in a mobile environment (unspecified location, such as outdoors).

If a worker in a mobile environment has only one reception terminal (e.g., a PHS phone) and does not respond to a PHS call because he or she is outside a reception area, no alternative exists to the abandonment of the data transmission effort. If, however, a worker in a mobile environment has a number of different radio communication terminals, in case the sending of a message using PHS is not possible, a natural reaction would be to try to send a message using a pager which has a larger reception area than is available with PHS.

A sender in an office will first try to send a message using PHS, for which the communication fee is lower than it is for a cellular phone but which has the same data processing capabilities; and then, if a communication link can not be established using PHS, the sender naturally will try to place the call using a cellular phone which in addition to having a larger reception area also has a higher communication fee, or a pager which has a larger reception area but which provides inferior data processing capabilities. Sending processing such as this is inefficient when it is allocated as a task to a user and is performed manually. In addition, receiving terminals have different data processing capabilities, such as permissible data size or character volume. Additionally, when the receiving terminal is switched from a PHS phone to a pager, the original message data is not always transferred seamlessly.

SUMMARY OF THE INVENTION

It is, therefore, one object of the present invention to provide a superior data sending apparatus with an alternate forwarding function.

It is another object of the present invention to provide a superior data sending apparatus with an alternate forwarding function for the exchange of data by different receiving terminal models.

It is an additional object of the present invention to provide a superior data sending apparatus with an alternate seamless forwarding function for the exchange of data by different receiving terminal models.

It is a further object of the present invention to provide a superior data sending apparatus with an alternate seamless forwarding function for the exchange of data by receiving terminal models that have different reception capabilities (reception areas, communication fees, received data processing capabilities, etc.).

To achieve the objects of the present invention, a data sending apparatus, for sending a message to an external receiving terminal, comprises: a user interface for inputting contents of a message or for designating a receiver; a first database for registering address information of respective receiving terminals carried by the same receiver; a second database for temporarily storing the contents of the message; sending means for sending, in accordance with the address information stored in the first database, the contents of the message, which is stored in the second database, to one of the receiving terminals carried by the same receiver; and alternate forwarding means for, when the sending means fails to forward the message under a predetermined condition, trying to forward the message to another receiving terminal carried by the same receiver.

The second database may manage the receiving terminals carried by the same receiver by providing a priority queue.

According to a second aspect of the present invention, a data sending apparatus, for sending a message to a receiver with car receiving terminals having different reception capabilities, comprises: a user interface for inputting contents of a message or for designating a receiver; a first database for registering address information and a priority queue of respective receiving terminals carried by the same receiver; a second database for temporarily storing the contents of the message; sending means for sending, in accordance with the priority queue stored in the first database, the contents of the message, which is stored in the second database, to one of the receiving terminals carried by the same receiver; and alternate forwarding means for, when the sending means fails to forward the message under a predetermined condition, trying to forward the message to a receiving terminal having the next highest priority.

In the data sending apparatus according to the first or the second aspects, when the receiving terminal is switched to another, the alternate forwarding means may include means for changing a format for the contents of the message or a size of the message in order to match the specifications of the other receiving terminal. When the receiving terminal has only a voice processing function, and does not have a data display function, the data sending apparatus may read the contents of the message and send it as a voice signal.

According to a third aspect of the present invention, a data sending method, for sending a message to an external receiving terminal by using an information processing apparatus that comprises a user interface for inputting address information of a receiving terminal carried by a receiver and contents of a message, a database for managing the input address information and the contents of the message, and sending means for sending a message to the external receiving terminal, comprises the steps of: (a) registering address information of receiving terminals carried by the same receiver to the database; (b) preparing a message via the user interface and storing the contents of the message in the database; (c) trying to send, in accordance with the address information stored in the database, the contents of the message stored in the database to one of the receiving terminals carried by the same receiver; and (d) trying alternate sending of the message to another receiving terminal carried by the same receiver when the sending process fails under a predetermined condition.

According to a fourth aspect of the present invention, a data sending method, for sending a message to a receiver who carries one or more receiving terminals having different reception capabilities by using an information processing apparatus that comprises a user interface for inputting address information of a receiving terminal carried by a receiver and contents of a message, a database for managing the input address information and the contents of the message, and sending means for sending a message to the external receiving terminal, comprises the steps of: (a) registering, in the database, address information of the receiving terminals carried by the same receiver and a priority queue for sending; (b) preparing a message via the user interface and storing the contents of the message in the database; (c) trying to send, in accordance with the priority queue stored in the database, the contents of the message stored in the database to one of the receiving terminals carried by the same receiver; and (d) trying alternate sending of the message to another receiving terminal of the same receiver when the sending process fails under a predetermined condition.

In the data sending method according to the third or the fourth aspect, at the step (d) which includes a process for switching the receiving terminals, a format for the contents of the message or the size of the message may be changed so as to match the specifications of the other receiving terminal. When the receiving terminal has only a voice processing function and does not have a data display function, the data sending apparatus may read the contents of the message and send it as a voice signal.

According to a fifth aspect of the present invention, a computer readable memory medium, in which is tangibly stored a computer program used to send a message to an external receiving terminal and that is operated by a computer system including a user interface for inputting address information of a receiving terminal carried by a receiver and contents of a message, a database for managing the input address information and the contents of the message, and sending means for sending a message to the external receiving terminal, the computer program comprises the steps of: (a) registering the address information of the receiving terminals carried by the same receiver in the database; (b) preparing a message via the user interface and storing the contents of the message in the database; (c) trying to send, in accordance with the address information stored in the database, the contents of the message stored in the database to one of the receiving terminals carried by the same receiver; and (d) trying alternate sending of the message to another receiving terminal carried by the same receiver when the sending process fails under a predetermined condition.

According to a sixth aspect of the present invention, a computer readable memory medium, in which is tangibly stored a computer program used to transmit a message to a receiver who carries one or more receiving terminals having different reception capabilities and that is operated by a computer system including a user interface for inputting address information of a receiving terminal of a receiver and contents of a message, a database for managing the input address information and the contents of the message, and sending means for sending a message to the external receiving terminal, the computer program comprises the steps of: (a) registering, in the database, address information of the receiving terminals carried by the same receiver and a priority queue for sending; (b) preparing a message via the user interface and storing the contents of the message in the database; (c) trying to send, in accordance with the priority queue stored in the database, the contents of the message stored in the database to one of the receiving terminals carried by the same receiver; and (d) trying alternate sending of the message to another receiving terminal of the same receiver when the sending process fails under a predetermined condition.

In the data sending method according to the fifth or the sixth aspect, at the step (d) including a process for switching the receiving terminals, a format for the contents of the message or for the size of the message may be changed so as to match the specifications of the another receiving terminal. When the receiving terminal has only a voice processing function and does not have a data display function, the data sending apparatus may read the contents of the message and send it as a voice signal.

According to a seventh aspect of the present invention, a data sending apparatus, for sending a message to a receiver carrying one more receiving terminals having different reception capabilities, comprises: a user interface for inputting contents of a message or for designating a receiver; a first database for registering address information of respective receiving terminals carried by the same receiver; a second database for temporarily storing the contents of the message; sending means for sending the contents of the message, which is stored in the second database, to a first receiving terminal, which has a relatively superior data reception capability but which has a relatively small reception area; and alternate forwarding means for, when the sending means fails to send the message to the first receiving terminal under a predetermined condition, trying to forward the message to a second receiving terminal, which has a relatively inferior data reception capability but which has a relatively large reception area.

According to an eighth aspect of the present invention, a data sending method, for sending a message to an external receiving terminal by using an information processing apparatus that comprises a user interface for inputting address information of a receiving terminal carried by a receiver and contents of a message, a database for managing the input address information and the contents of the message, and sending means for sending a message to the external receiving terminal, comprises the steps of: (a) registering address information of receiving terminals carried by the same receiver to the database; (b) preparing a message via the user interface and storing the contents of the message in the database; (c) trying to send the contents of the message, which is stored in the database, to a first receiving terminal, which has a relatively superior data reception capability but which has a relatively small reception area; and (d) when the sending means fails to send the message to the first receiving terminal under a predetermined condition, trying to forward the message to a second receiving terminal, which has a relatively inferior data reception capability but which has a relatively broad receiving area.

According to a ninth aspect of the present invention, a computer readable memory medium, in which is tangibly stored a computer program used to transmit a message to a receiver who carries one or more receiving terminals having different reception capabilities and that is operated by a computer system including a user interface for inputting address information of a receiving terminal carried by a receiver and contents of a message, a database for managing the input address information and the contents of the message, and sending means for sending a message to the external receiving terminal, the computer program comprises the steps of: (a) registering, in the database, address information of the receiving terminals carried by the same receiver and a priority queue for sending; (b) preparing a message via the user interface and storing the contents of the message in the database; (c) trying to send the contents of the message, which is stored in the database, to a first receiving terminal, which has a relatively superior data reception capability but which has a relatively small reception area; and (d) when the sending means fails to send the message to the first receiving terminal under a predetermined condition, trying to forward the message to a second receiving terminal, which has a relatively inferior data reception capability but which has a relatively broad reception area.

According to the seventh through the ninth aspects, the first receiving terminal is a PHS (Personal Handyphone System) phone and the second receiving terminal is a pager (pocket bell), for example.

According to the present invention, first, message sending is tried to one of the receiving terminals carried by a receiver. For example, a sender in an office first tries to send data to a PHS phone, for which a lower communication fee is charged than is charged for a cellular phone but which has the same data processing capabilities as other among radio communication terminals carried by the same receiver in a mobile environment.

When communication is not established under a predetermined condition, e.g., within a predetermined period of time, the sender then tries alternate message forwarding to another receiving terminal carried by the same receiver. When, for example, the sender can not communicate with the receiver in the mobile environment by calling his or her PHS phone, the sender alternately tries to communicate with a cellular phone, for which a higher communication fee is charged but which has a broader reception area, or his or her pager, which has an inferior data processing capability but which has a broader reception area. Since such alternate sending is automatically performed by a data sender in accordance with alternate forwarding information stored in advance, no effort is required of a user.

Even when the received data processing capability (e.g., the input available character size) differs between a receiving terminal having a higher priority (data sending to it is tried first) and a receiving terminal having a lower priority (data sending to it is tried second), the system changes the format of the contents of message or the size of the message to one that is adequate, so that an alternate, seamless forwarding can be implemented.

The other objects, features, and advantages of the present invention will become apparent during the course of the detailed description of the embodiment of the present invention, which will be given while referring to the accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 7 is a diagram showing a sub-menu for "Tools" on the menu bar in the main window;

FIG. 8 is a diagram showing a sub-menu for "New" on the menu bar in the main window;

FIG. 9 is a diagram showing a sub-menu for "Window" on the menu bar in the main window;

FIG. 10 is a diagram showing a sub-menu for "Help" on the menu bar in the main window;

FIGS. 16(a) through (e) are diagrams showing sub-menus for menu items on the menu bar of the "New Message" window;

DETAILED DESCRIPTION OF THE INVENTION

Figure 1:
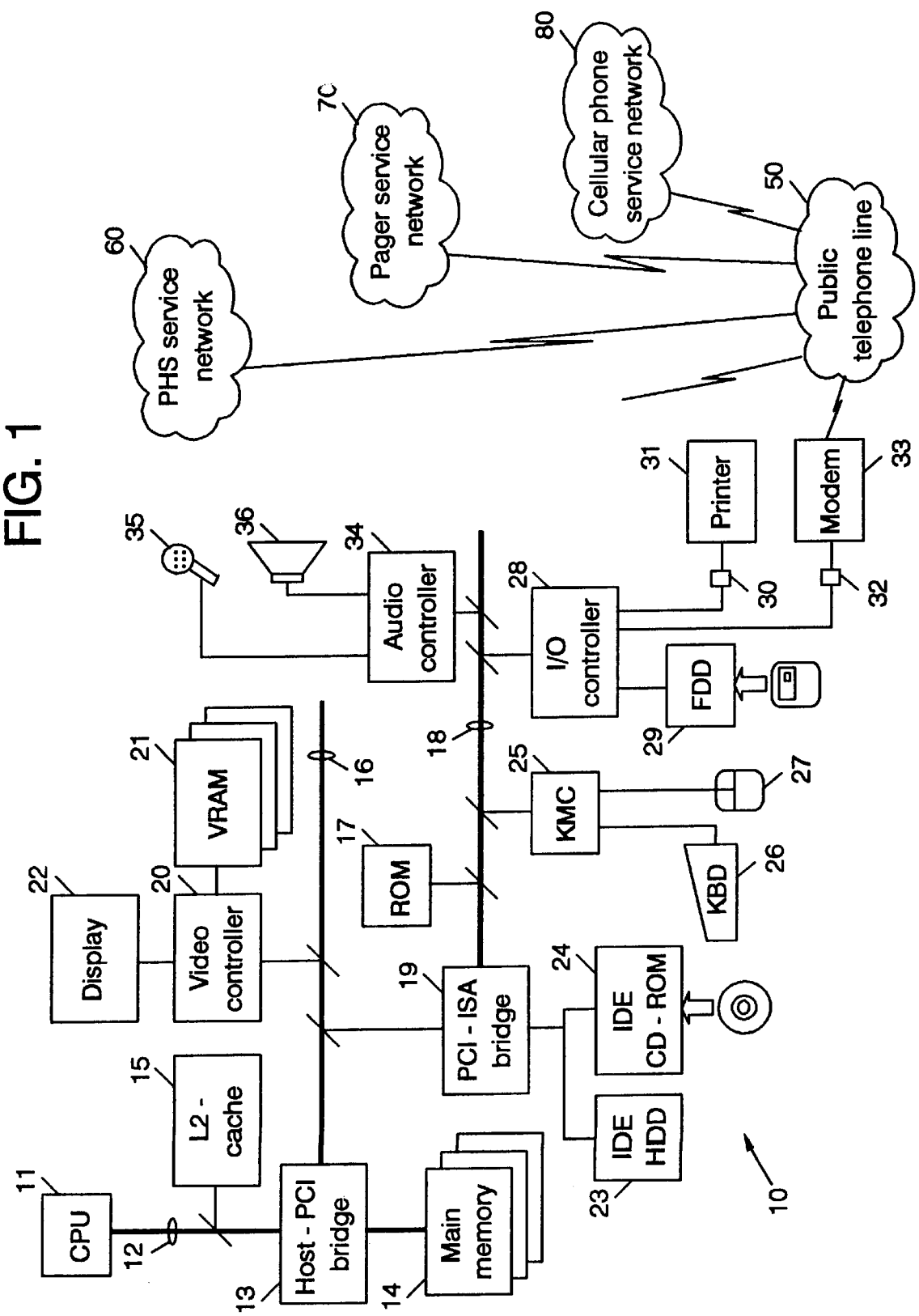
FIG. 1 is a specific diagram illustrating a hardware arrangement of a personal computer appropriate for the present invention.

FIG. 1 is a schematic diagram illustrating the hardware arrangement of a personal computer (PC) 10 that is appropriate for a data sender according to the present invention. In this embodiment, the PC 10 acts as a message sender, i.e., as a "data sending apparatus", which will be described later. To accomplish the present invention, preferably, the PC 10 conforms to the OADG (PC Open Architecture Developer's Group) standards, and has WINDOWS95™, produced by Microsoft Corp., installed. The respective sections of the PC 10 will now be described.

A CPU 11, a main controller, executes various programs under the control of an operating system (OS). The CPU 11 can be, for example, a PENTIUM™ by Intel Corp. The OS can be, for example, "Windows 95" by Microsoft Corp.

The CPU 11 is mutually connected with respective hardware blocks via three buses, including a processor bus 12 that is directly connected to an external pin of the CPU 11, a PCI (Peripheral Component Interconnect) bus 16 that serves as a local bus, and an ISA (Industry Standard Architecture) bus 18 that serves as an input/output bus.

The processor bus 12 is coupled with the PCI bus 16 by a bridge circuit (host-PCI bridge) 13. The bridge circuit 13 in this embodiment includes a memory controller for controlling the access for a main memory 14, and a data buffer for absorbing the speed difference between the buses 12 and 16.

The system includes as memory devices the main memory 14, an L2-cache memory 15 and a ROM 17. The main memory 14 is employed as a program load area or as a work area for the executed program, and in general comprises a plurality of DRAM (Dynamic RAM) chips. Programs are, for example, an OS, such as Windows 95, and application programs, such as a "mail service application" (which will be described later). The L2-cache 15 is a high speed memory in which code/data to be frequently accessed are temporarily stored so that the CPU 11 absorbs the time required for accessing the main memory 14. Generally, an SRAM (Static RAM) chip is employed for the L2-cache 15. The ROM 17 is a read only memory in which are permanently stored a test program (POST) executed when power is turned on, and codes used for operating hardware components of the system 10.

The PCI bus 16 has a relatively fast data sending speed (a bus width of 32 bits, an operating frequency of 33 MHz and a maximum data sending speed of 132 KBps). Peripheral devices that operate relatively fast, such as a video controller 20, a card bus controller (not shown) and a network subsystem (e.g., a communication adaptor, not shown), are connected to the PCI bus 16.

The video controller 20 is a dedicated controller for the actual processing of image drawing commands transmitted by the CPU 11. The video controller 20 writes processed image data into a screen buffer (VRAM) 21, and reads the image data from the VRAM 21 and outputs it to a display 22.

The PCI bus 16 and the ISA bus 18 are mutually connected by a bridge circuit (PCI-ISA bridge) 19. The bridge circuit 19 in this embodiment includes a DMA controller, a programmable interrupt controller (PIC), and a programmable interval timer (PIT).

The bridge circuit 19 in this embodiment also has an IDE connector for the connection of an external memory device that conforms to the IDE (Integrated Drive Electronics). An IDE hard disk drive (HDD) 23 and an IDE CD-ROM drive 24 are connected to the IDE connector. The HDD 23 is superior to the other external memory devices in its access speed. When programs (the OS, device drivers, applications, etc.) are copied on the HDD 23 (that is, "installed" into the system), the programs are ready for running on the system. The CD-ROM drive 24 is used mainly for the installation of programs tangibly stored on a compact disk.

The ISA bus 18 has a lower data sending speed than the PCI bus (a bus width of 16 bits and a maximum data sending speed of 4 MBps), and is employed for the connection of low speed peripheral devices, such as a keyboard/mouse controller (KMC) 25, an I/O controller 28, and an audio controller 34.

The KMC 25 is a dedicated controller for fetching, as computer data, scan code input at a keyboard 26, and coordinate values designated by using a mouse (pointing device) 27 and placing them on the bus 18.

The I/O controller 28 is a dedicated controller for driving a floppy disk drive (FDD) 29 and for controlling parallel or serial data sending performed via a parallel port 30 or a serial port 32. In general, a printer 31 is connected to the parallel port 30, and a modem 33 is connected to the serial port 32.

The FDD 29, as well as the HDD 23 and the CD-ROM drive 24, is a type of external memory device. The FDD 29 is employed to install programs on a floppy disk (FD) and to save work data.

The modem 33 is a device that enables data exchange across a public telephone line 50, which is an analog signal communication medium. The modem 33 converts a digital signal in the system 10 into an analog signal and transmits it to the line 50, or it converts an analog signal received across the line 50 into a digital signal and fetches it to the system 10. In this embodiment, assume that the PC 10 is mutually connected to radio communication services, such as a PHS (Personal Handyphone System) service 60, a pager service 70 and a cellular phone service 80, all of which are tentative names. A radio communication terminal that acts as a data receiver for the present invention is located in a reception area for a corresponding service network. It should be noted that, to implement the present invention, the PC 10 is not limited to being connected to these networks 50, 60, 70 and 80 via the modem 33, and may be connected to these networks 50 to 80 via a LAN by using a communication adaptor not shown.

An audio controller 34 is a dedicated controller for inputting and outputting audio signals. The audio controller 34 receives, as computer data, an audio signal input by a microphone 35, or converts digital audio data into analog data and outputs it through a loudspeaker 36.

A typical user of the personal computer 10 operates the system by using the keyboard 26 or the mouse 27 to execute various application programs, such as a word processor, table calculations, and communication, and employs the program data on a display screen (i.e., at desktop) to help in his or her work. The user copies a desired application from the CD-ROM drive 24 or the FDD 29 to the HDD 23 to install the application into the system. It should be noted that the present invention can be accomplished as an application program that is installed.

Many other electric circuits in addition to those shown in FIG. 1 are required to constitute the computer system. However, since these circuits are well known to one having ordinary skill in the art, and are not related to the subject of the invention, only partial connections for the respective hardware blocks are shown to avoid complexity in the drawings.

As previously described above, an explanation was given to the effect that a program to be installed is provided on a memory device, such as a CD or an FD, and that the present invention can be accomplished in the form of an installed program (hereinafter tentatively referred to as a "mail service application"). A a work environment provided by the mail service application will now be described.

Figure 2:
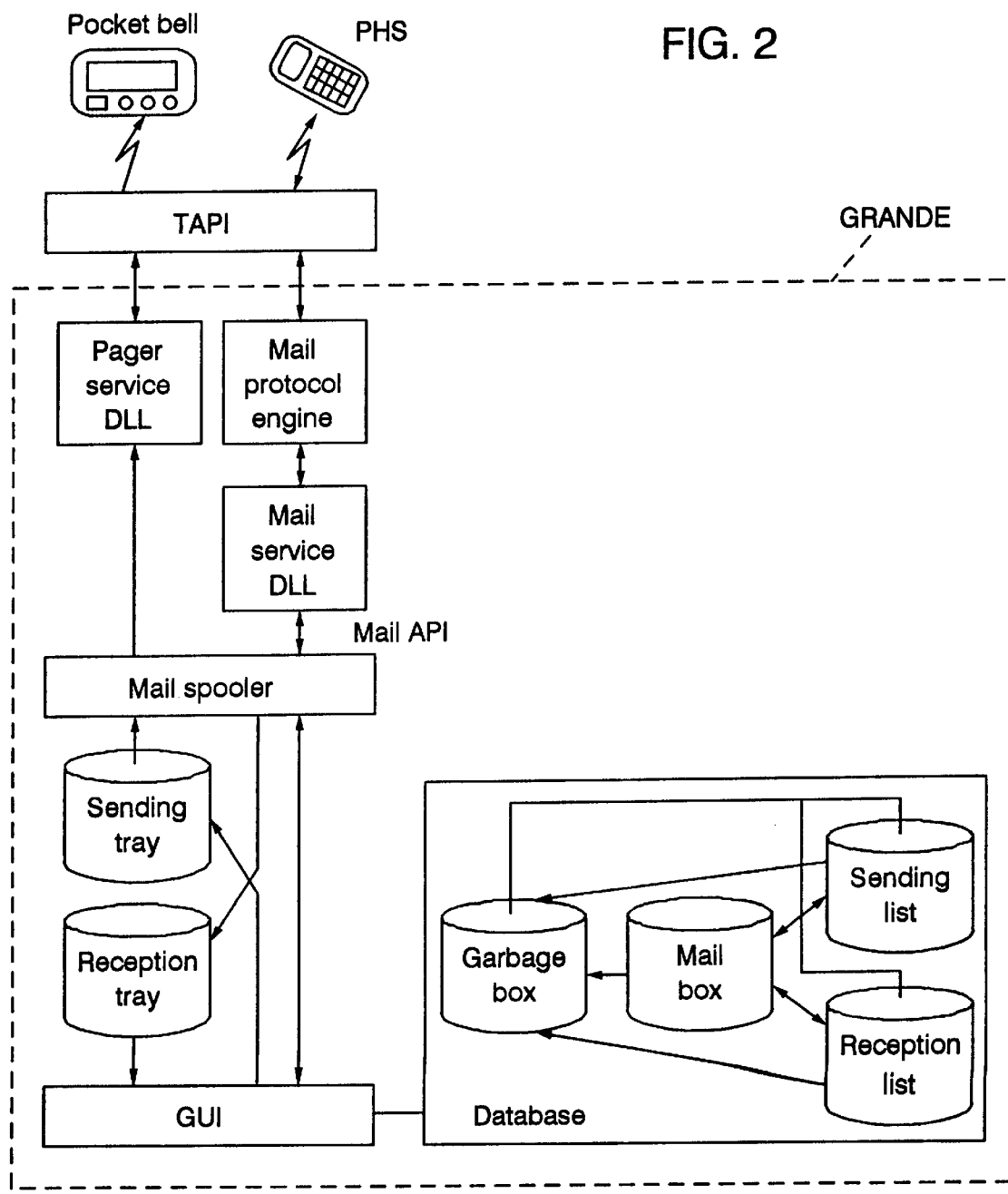
FIG. 2 is a specific diagram illustrating the arrangement of program modules according to the present invention.

As shown in FIG. 2, the mail service application comprises modules, such as a GUI (Graphical User Interface), a mail spooler, a mail protocol engine, a mail service DLL (Dynamic Link Library), a pager service DLL, and a database. An explanation for the respective modules will now be given.

The GUI is a user interface employed when a user interactively transmits data and instructions to the system such as by manipulating an icon on the display 22 with a mouse. In this embodiment, the GUI supports the preparation of mail, the instruction of sending and receiving commands, and the management of mail and addresses (which will be described subsequently herein).

The mail spooler functions in the background to monitor the exchange of mail. The mail spooler is implemented by providing a buffering area in the middle between the CPU 11 and the modem 33, and dispatches mail in a sending tray and temporarily retains received mail in a reception tray received mail. The mail spooler in this embodiment includes an interface with the pager service DLL and an interface with the mail service DLL.

The mail service DLL is a module that, in response to a call from the mail spooler, connects or disconnects the public telephone line 50, authenticates a user with a PHS phone, and sends and receives mail. The mail service DLL exchanges events, such as a notice of reception of mail, a sending request and a sending terminate request, with the mail protocol engine, while, for the mail spooler, the mail service DLL prepares a mail API (Application Programming Interface) for requesting sending and reception services.

The mail protocol engine is a module for the operation of hardware for actual communication, and has the mail protocol mounted to authenticate PHS phone users and to exchange data. A TAPI (Telephony API) is positioned between the mail protocol engine and the hardware components, such as the modem 33. The TAPI sets various parameters, such as transfer speeds for the modem 33, and absorbs the differences between the operating speeds of the hardware components.

The pager service DLL is a module for the hardware operation for sending data to the pager. The above described TAPI (Telephony API) is positioned between the pager service DLL and hardware components, such as the modem 33.

The mail service application manages the database, in which are stored such data components as a "sending list," a "reception list," a "sending tray," a "reception tray," a "mail box" and a "trash box."

The sending list and the reception list are used to hold the sent mail and the received mail histories, and can be erased following a predetermined period of time, or as instructed by a user.

The sending tray temporarily holds mail waiting to be dispatched. When mail for sending is either moved from the mail box to the sending tray, or a new document is prepared and placed in the sending tray, it is sent in the background by the mail spooler in accordance with instructions issued by the user. It should be noted that the sending tray is not visible to a user, i.e., the sending tray is not displayed on the GUI.

The reception tray temporarily holds mail received in the background by the mail spooler. The received mail is moved from the reception tray to the mail box and is saved therein. It should be noted that the reception try is not visible to a user, i.e., the reception tray is not displayed on the GUI.

The mail box is a file for saving mail to be sent or mail that has been received, and may be prepared separately for each category.

A garbage container temporarily holds deleted mail. Mail in the garbage can be erased on the instruction by a user or at the termination of the program.

The PHS, which is a receiving terminal in this embodiment, supports a communication function that conforms to the protocol of the previously described mail protocol engine, and a received data display function. A terminal program for supporting these functions is hereinafter referred to as a "MicroClient."

An explanation will now be given for the display screens prepared by the GUI, as well as the functions on these display screens, and an interactive input operation on the display screens.

The mail service application icon is displayed on a desktop screen. The mail service application can be activated by double clicking on the icon.

Figure 3:
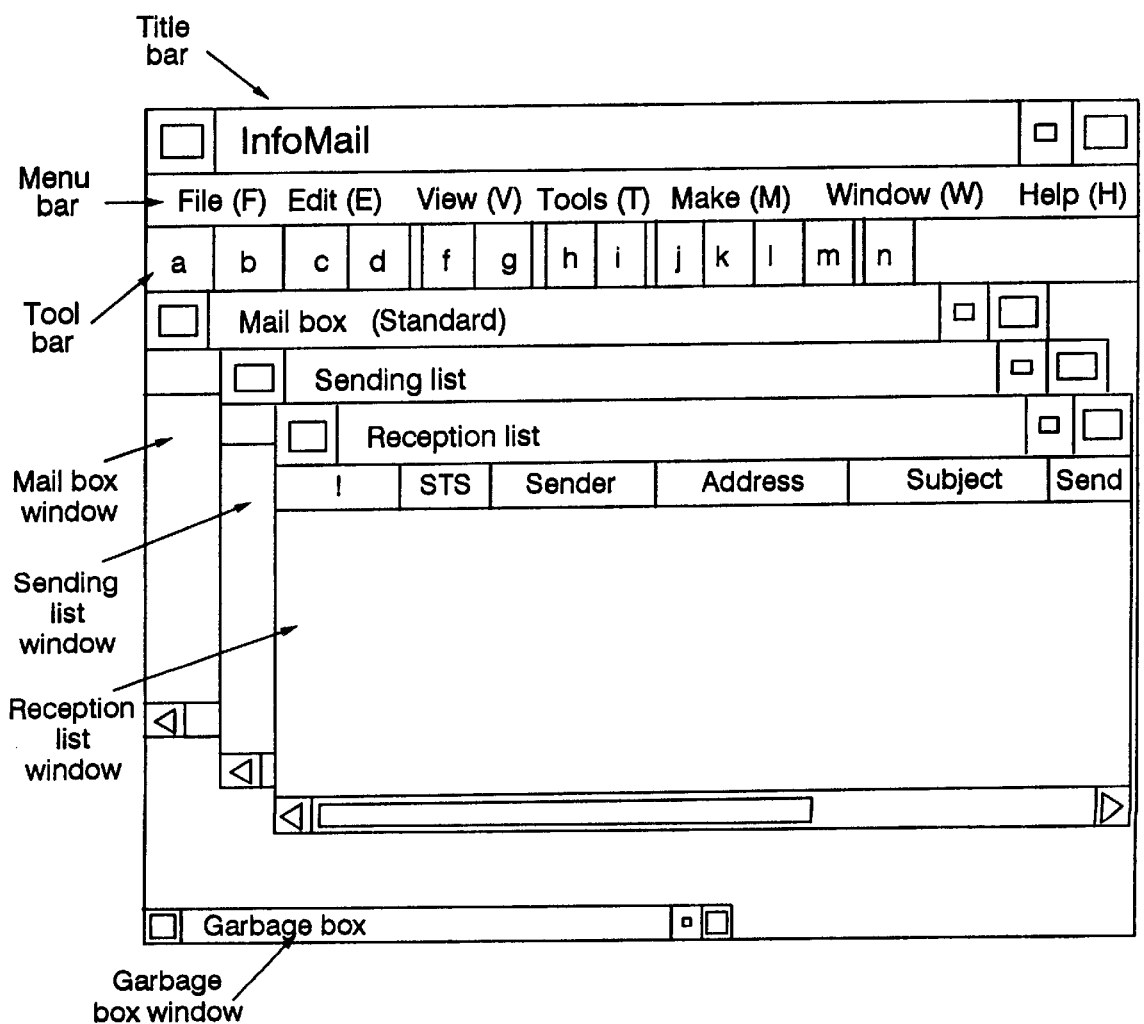
FIG. 3 is a diagram showing a main window screen when a mail service application is activated.

FIG. 3 is a diagram showing a main window screen when the mail service application is activated. As is shown in FIG. 3, a title bar, a menu bar and a tool bar are provided in parallel starting at the top of the main window. In addition, a mail box window (standard), a sending list window, a reception list window and a garbage box window are provided as standard feature in the main window.

The title bar is an area for displaying the name (title) of an application or a file for this window, and is provided at the top of all windows, as is well known.

The menu bar is an area for displaying a list of commands that can be selected, as is well known. The menu bar for the main window includes the menu items "File," "Edit," "View," "Tools," "Make," "Window" and "Help." Sub-menu items shown in FIGS. 4 through 10 are prepared for each of the above menu items. When one of the items in the menu bar is selected by clicking on it with the mouse 27, the selected item is highlighted, and a corresponding sub-menu appears as though pulled down like a window blind. When the mouse 27 is double clicked on an item in a sub-menu, the item in the sub-menu is selected, and a corresponding function is performed.

Figure 4:
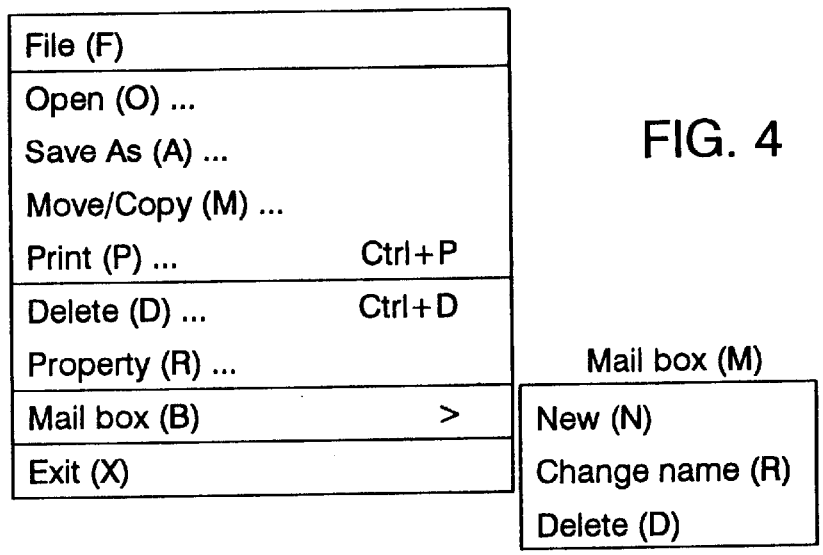
FIG. 4 is a diagram showing a sub-menu for "File" on the menu bar in the main window.

The "File" in the menu item includes a function relating to the filing operations for mail sent or received, and provides the sub-menu shown in FIG. 4. "Open" is a function for displaying the contents of a selected item of mail in a window. "Save As" is a function for saving the selected mail item in a designated text file. And "Move/Copy" is a function for saving a selected mail in a text file. Whether or not mail is copied without moving can be selected on the "Move/Copy" panel (not shown). "Print" is a function for printing the selected mail item. "Delete" is a function for deleting the selected mail item. "Properties" is a function for displaying the properties of the selected mail item in a "Properties" panel (not shown) and updating it. The properties include data concerning mail sending and mail priorities. "Mail Box" is a function for creating a mail box and for altering or deleting a name, and when it is clicked on, as is shown in FIG. 4, a sub-menu for "New," "Change Name" and "Delete Name" is pulled down. When "New" is activated, a "New" panel (not shown) is popped up on the display to input the name of a new mail box. When the name of the mail box is input on the pop-up screen, a new mail box window is opened. "Exit" is a function for closing the mail service application.

Figure 5:
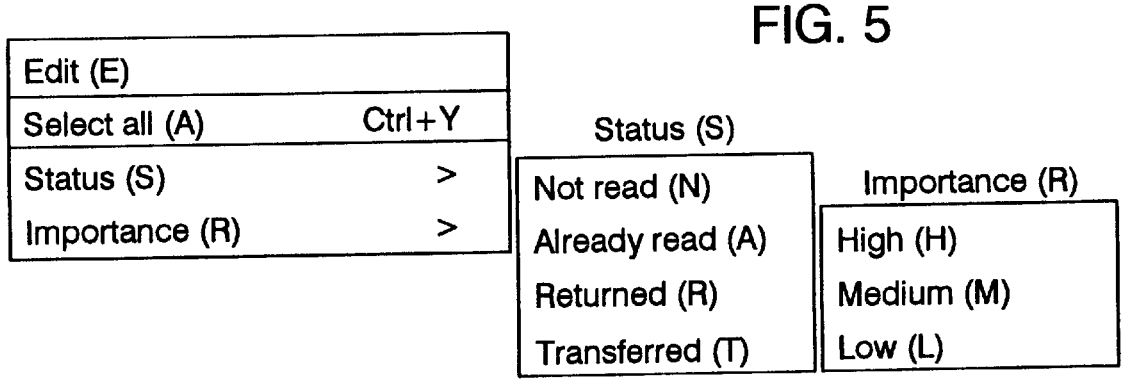
FIG. 5 is a diagram showing a sub-menu for "Edit" on the menu bar in the main window.

Menu item "Edit" includes a function for handling the attributes of mail sent or received, and prepares the sub-menu in FIG. 5. "Select All" is a function for selecting all the items in an active window. "Status" is a function for changing the status of designated mail, and has a sub menu of available statuses "Not Read," "Already Read," "Returned" and "Transferred." "Importance" is a function for changing the importance of a designated item of mail, and brings up a sub-menu for assigning a relative importance of "High," "Medium" or "Low."

Figure 6:
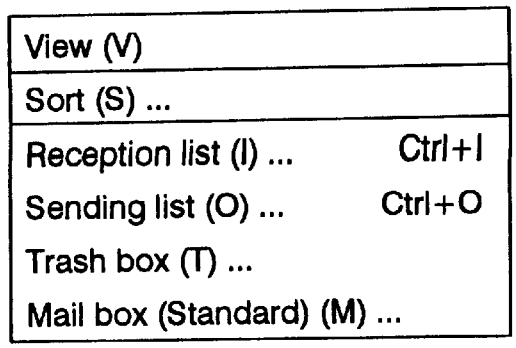
FIG. 6 is a diagram showing a sub-menu for "View" on the menu bar in the main window.

Menu item "View" is a function for controlling the display of a list of the mail in the mail box, and for it the sub-menu shown in FIG. 6 is prepared. When "Sort" is selected, a "Sort" panel (not shown) is popped up, and to sort the mail, one of the sorting references on the panel, such as importance, status, sender, address, subject or sending time, and whether to sort in ascending order or in descending order are selected. "Reception List," "Sending List" and "Mail box" are functions for actively displaying a reception list window, a sending list window and a mail box window (standard).

Menu item "Tools" is used to handle additional functions for mail sending and reception, and the sub-menu in FIG. 7 is prepared for it. "Distribute" is a function for beginning the sending of mail that is queued in the sending tray. "Address" is a function for opening an address book. In the address book window, the name of a receiver's terminal and the address of the user can be registered in, deleted from, and added to the address book, which will be described later. "Search" is a function for searching for a designated item of mail in a mail box by using as a key a search identifier for the designated mail item. The conditions for the performance of a search can be input using a "Search" window (not shown). "Change Tool Bar" is a function for changing the functions or the menus registered in the boxes in the tool bar and for changing the menu, which will be described later. "Option" is a function for setting options concerning the receipt and return of mail. The option functions here are an additional, selective functions, such as the generation of a sound when mail is received, or the display of a confirmation statement when a message is deleted.

Menu item "Make" is a function for creating mail or a message, and provides the sub-menu shown in FIG. 8. "New Message" is a function for opening a "New Message" window (which will be described later) and for inputting a message. "Return to Sender" is a function for returning mail to a sender. "Return to All" is a function for returning mail to all addressees to whom the mail was originally sent. "Forward" is a function for forwarding mail to another address.

Menu item "Window" is a function for designating a display format for the screen of the main window, and provides the sub-menu shown in FIG. 9. The "Window" menu is almost the same as the "Window" menu in "Windows Ver 3.1," by Microsoft Corp., and no explanation for its contents will be given.

Menu item "Help" is a function for calling a help function, and provides the sub-menu shown in FIG. 10.

As is well known, the tool bar is an area wherein icon buttons (also called "tool boxes"), with which frequently used functions are immediately activated, i.e., by a single click of the mouse 27, are arranged in line, horizontally. In FIG. 3, the tool bar has 13 tool boxes a through n. The functions/menus registered in the tool boxes can be changed by using "Change tool bar" in the sub-menu of "Tools", and are allocated as defaults, as is shown in [Table 1].

Figures 11, 12:
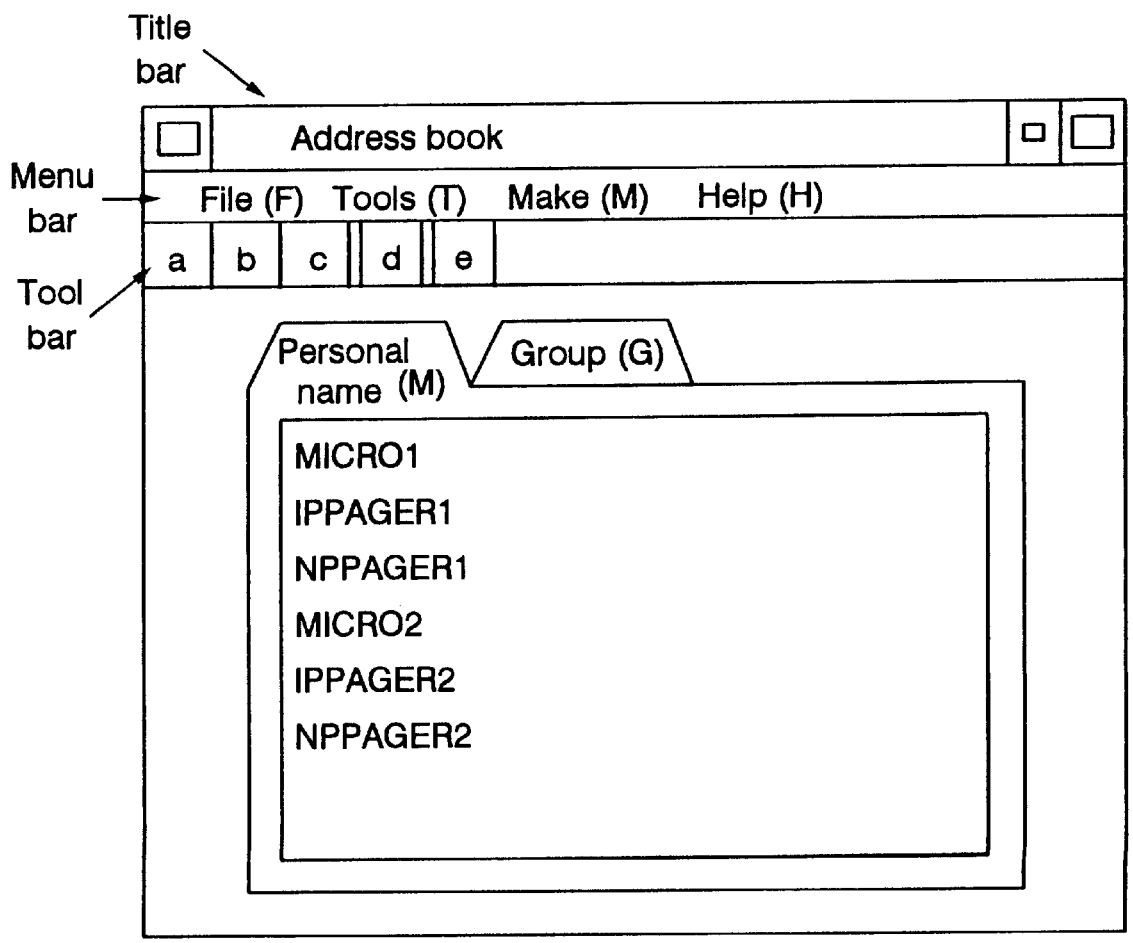
FIG. 11 is a diagram showing the fields that are included in a mail header.
FIG. 12 is a diagram showing an "Address Book" window screen.

TABLE 1 a: Move/copy mail
b: Print mail
c: Delete mail
d: Create mail box
f: Display reception list
g: Display sending list
h: Distribute
i: Address book
j: Create message
k: Return to sender
l: Return to all
m: Forward
n: help The "Mail Box" window (standard), the "Sending List" window, the "Reception List" window and the "Trash Box" window are employed to display lists of mail headers held in the mail box, the sending list, the reception list and the trash box described above. FIG. 11 is a diagram showing the items in a mail header. The first field in the mail header is used to display the degree of importance of mail. An "!" is displayed for mail that is of much importance; nothing is displayed for mail that is of average importance; and a "↓" is displayed for mail that is of little importance. The following field "STS" is used to display the status for mail. Either "S" (sent), "Q" (queuing), "QT" (queuing by designating time), "E" (error) or "QE" (sending error), is displayed in the STS field for sent mail. A sender, an address, a subject and a sending date are displayed in the following fields. The display order for the mail header in each window can be changed using "Sort" in the sub-menu for "View."

To use the mail service application it is necessary to register receivers in the address book in advance. The "Address Book" window is opened either by selecting from the sub-menu for "Tools" the previously described "Address Book," i.e., by double clicking on it with the mouse 27, or by single clicking of the mouse 27 on the address book tool box in the previously described tool bar. In this manner, the address book can be edited, i.e., the registration, alteration or deletion of a receiver in the address book and the grouping of users can be performed.

In FIG. 12 an "Address Book" window is shown. In the widow, from the top, a title bar, a menu bar and tool bar are provided in parallel. In addition, a personal name tab, for displaying a list of users' terminals registered in the address book, and a group tab, for displaying a list of group names that are registered and have one or more users as members, are prepared for the "Address Book" window. The window is designed to simulate pages in an address book. The personal name tab and the group tab are displayed selectively, and in FIG. 12 the personal tab has been opened.

The menu bar of the "Address Book" window includes menu items "File," "Tool," "Make" and "Help," as is shown in FIG. 12. The sub-menus shown in FIGS. 13 (a) through (d) are prepared for menu items. The sub-menus are pulled down by single clicking with the mouse 27.

The six functions in [Table 2] are allocated as the defaults for the tool boxes in the "Address Box" window.

TABLE 2 a: Create entry
b: Change name
c: Delete
d: Properties
e: Create message
f: Help To register a mail receiver (individual) in the address book, either "Entry" in the sub-menu in "File", or the tool box "Create entry" is selected when the personal tab is displayed, as shown in FIG. 12. Then, a "New Name Property" panel popps up.

Figure 14:
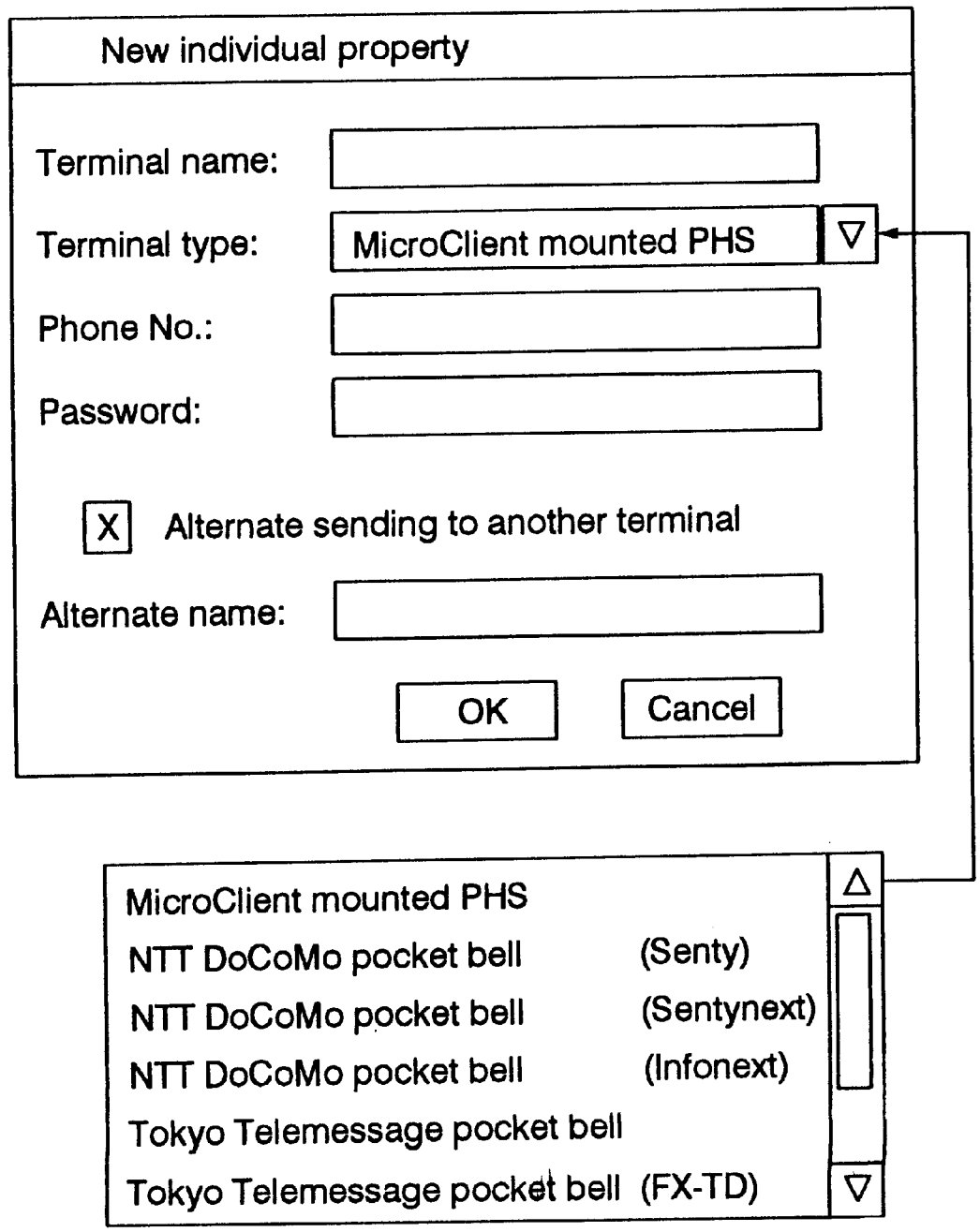
FIG. 14 is a diagram showing a "New Individual Property" panel that pops up in the "Address Book" window.

In FIG. 14 the "New Name Property" panel is shown. This panel has the input fields of "Terminal Name," "Terminal Type," "Telephone No.," "Password," and "Alternate Name."

"Terminal Name" is a field into which is entered a name for specifying a user, such as the user's name, the name of his or her terminal, or his or her nickname. The name input can be designated in the address field for the sending of mail.

"Terminal Type" is a field for designating the type of receiving terminal. The terminal type can be selected from a pull-down list shown on the right in FIG. 14.

"Telephone No." is a field into which is entered the telephone number for the receiving terminal designated in the "Terminal Type" field.

"Password" is a field into which is entered a password for authenticating a user. The meaning of the password to be input varies depending on the type of a designated terminal. For example only, the password for a pocket bell (pager) is a "password service" of, for example, the NTT DoCoMo Next Service, while the password for a PHS with Micro-Client (previously described) is a parameter required for authentication of the mail protocol. In case a terminal stet does not support the password service (e.g., NTT DoCoMo pocket bell (Senty) or Tokyo Telemessage pocket bell) is designated in the terminal type field, the input of a password is not possible.

"Alternate Name" is a field for designating the name of a terminal that acts as an alternate receiver. Alternate sending is automatically performed when the sending to the terminal designated in the "Terminal Type" and "Telephone No." is not successful within a predetermined period (see sub-division D). It should be noted that the alternate sending will not actually be performed unless the check box "Alternate sending to another terminal" is checked.

Any type of terminals displayed in the pull-down list "Terminal Type" can normally act as a designated receiver or an alternate receiver. In other words, the user of the "mail service" can arbitrarily select the types of receiving terminal on the "Property" panel within a given range. However, while taking into consideration the fact that a lower communication fee is charged for PHS than is charged for the cellular phone, both of which have the same data processing capability, and that the reception area for the pocket bell is much broader than that for PHS, even though the data processing capability of the pocket bell is inferior, mail sending using the PHS should be tried first, and then the alternate sending to the pocket bell should be performed.

When the above fields are filled and then the "OK" button is clicked, the contents of the panel are registered in the address book, and the registered "Terminal Name" appears as the personal name tab. When the "Cancel" button is clicked, the contents of the panel are erased and aren't registered. And when any button is clicked, the display is closed and returned to the address book window (FIG. 12).

Since the registration of a group is not directly related to the subject of the present invention, no explanation for it will be given. To change a personal name or the contents of a group that is already registered, either the target entry to be changed in the personal name tab or in the group tab is designated and the "Property" tool box is selected by single clicking on it with the mouse 27, or the target entry to be changed in the personal name tab or in the group tab is selected by double clicking on it with the mouse 27. The corresponding "Property" panel will then pop up.

The contents of the sending mail, i.e., messages, are created in the "New Message" window. The "New Message" window is opened either by double clicking with the mouse 27 on the personal name (or a group name) of a receiver on the personal name (or the group) tab in the "Address Book" window (previously described), by single clicking with the mouse 27 on the tool box "New Message" in the tool bar (previously described), or by double clicking with the mouse 27 on the sub-menu entry "New Message" of "Make." As a result, creating message is possible.

Figure 15:
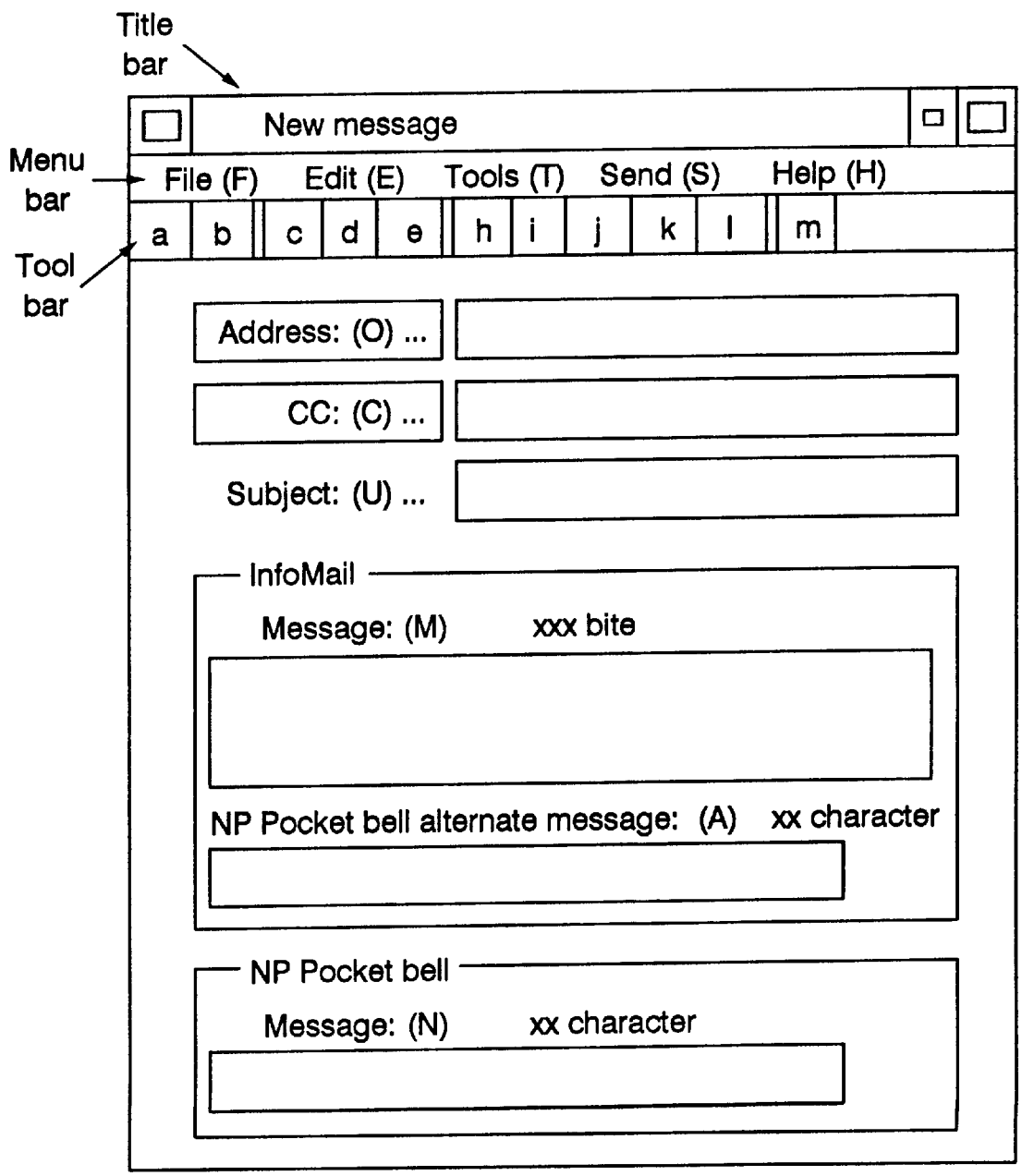
FIG. 15 is a diagram showing a "New Message" window screen.

In FIG. 15 is shown a "New Message" window screen. In this window, from the top, a title bar, a menu bar and a tool bar are provided in parallel. In addition, a plurality of input fields are provided in the window.

As is shown in FIG. 15, the menu bar for the "New Message" window includes the menu items "File," "Edit," "Tools," "Send" and "Help." In addition, the sub-menus shown in FIGS. 16(a) to (e) are prepared for the menu items. Each sub-menu is pulled down by single clicking with the mouse 27 on a corresponding menu item.

Also, the 11 functions shown in [Table 3] are allocated by default to the tool boxes in the "New Message" window.

TABLE 3 a: Read file
b: Print
c: Cut
d: Copy
e: Paste
h: Address book
i: Send rapidly
j: Place in sending queue
k: Send at designated time
l: Save
m: Help As is shown in FIG. 15, the "New Message" window includes an "Address" field, a "CC" field, a "Subject" field, an "InfoMail" input area, and an "NP Pocket Bell" field.

Figure 17:
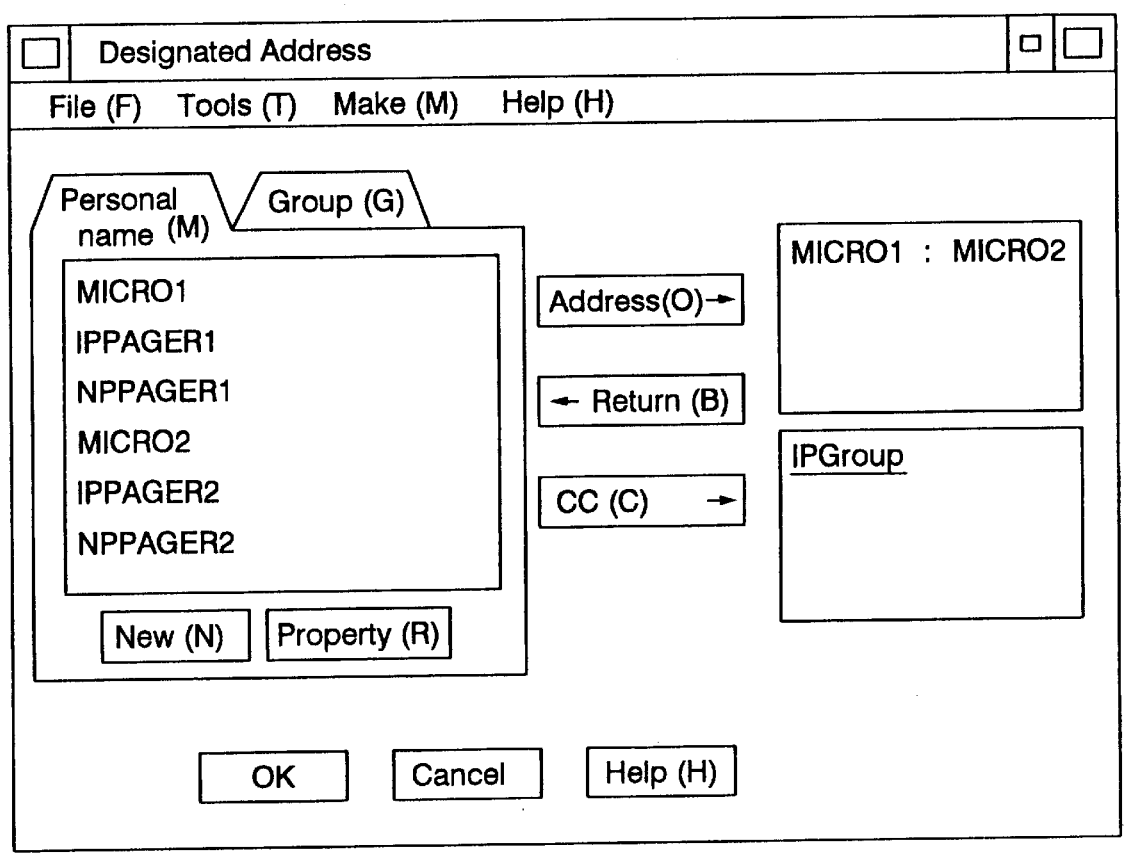
FIG. 17 is a diagram showing a "Designate Address" panel that pops up in the "New Message" window.

The "Address" field and the "CC" field are used to designate the address for a message and a destination for the sending of a carbon copy. Only a user's name or a group name already registered in the above described address book can be input in these fields. An "Address" button and a "CC" button are arranged to the left of the two fields. When either button is clicked, a "Designate Address" panel shown in FIG. 17 pops up in the window, and with this panel, a user can interactively input the address and the CC. When a "Make" button or a "Property" button on the "Designate Address" panel are selected by clicking on them with the mouse 27, a new personal name or a new group can be created, or a personal name or the property of a group can be updated. A detailed explanation of these operations will not be given.

The "Subject" field is a field where the name of the message is input. Either Kanji characters, DBCS or SBCS Japanese cursive or angular syllabary characters, or alphabetic or numeric symbols can be input, and no particular limit is imposed on the input character count (a blank is also acceptable). It should be noted, however, that the contents of the "Subject" field are sent only to a PHS phone on which is installed a MicroClient that can handle this field, and the contents are not sent to the pocket bell.

In the "InfoMail" input area is a "Message" field. The "Message" field is the area in which is written the text of the message that is to be sent to the receiver designated in the "Address" field. The character count to be input and the character size should match the type of a designated receiving terminal. For a PHS phone on which a MicroClient is installed, for example, no limit is imposed on the character count and on the permitted character sizes. However, for an NTT DoCoMo pocket bell (Infonext), only a maximum of 100 bytes can be input (presuming two bytes are used for a DBCS character and one byte is used for a SBCS character).

When the message can not be sent to the terminal designated in the "Address" field and the "CC" field, the message is automatically forwarded to a terminal that is registered in the address book as an alternate receiver for the originally designated terminal (which will be described later). At this time, when the message/data receiving capability of the alternate receiving terminal is inferior to that of the originally designated terminal, the contents input in the "Message" field can not always be sent unchanged. When a message having a size greater than 100 bytes, one which was created for a MicroClient mounted PHS phone, is to be forwarded to an IP pocket bell, a message covering only the first 100 bytes is sent. The reception capability of an NP pocket bell is inferior to that of both a MicroClient mounted PHS phone and an IP pocket bell (well known). Therefore, if an NP pocket bell is designated as an alternate receiver, an "NP pocket bell alternate message" field for the entry of a special message for the NP pocket bell shall be provided at the bottom of the "New Message" window (see FIG. 15). However, so long as the contents of the "Message" field corresponds to the reception capability of the NP pocket bell, no entry in the "NP pocket bell alternate message" is required.

The "NP pocket bell" field is provided for the entry of a special message for an NP pocket bell when an NP pocket bell is one of the receiving terminals designated in the "Address" field or the "CC" field. However, so long as the contents in the "Message" field corresponds to the reception capability of the NP pocket bell, no entry in the "NP Pocket Bell Alternate Message" field is required.

The size of a message that an NP pocket bell can receive differs a little depending on the terminal type (see Table 4).

TABLE 4

| Terminal type: | Maximum input characters |
| --- | --- |
| NTT DoCoMo pocket bell(Senty): | 12 characters |
| NTT DOCoMo pocket bell(Sentynext): | 11 characters |
| Tokyo Telemessage pocket bell: | 9 characters |
| Tokyo Telemessage pocket bell(FX-TD): | 12 characters |

A message sending method and a message sending process will be explained in this sub-division.

A message sending method can be performed by using menu item "Send" on the menu bar. When this menu item is clicked on with the mouse 27, the sub-menu in FIG. 16(d) is pulled down. On the sub-menu are four items: "No Delay", "Sending Queue," "Designate Time" and "Keep." "No Delay" is a function for designating the immediate sending of mail following its creation. "Sending queue" is a function for placing the mail in a queue in the previously described sending tray. When the previously described tool box "Distribute" on the tool bar is selected, the sending of mail queued in the sending tray is begun. "Designate Time" is a function for holding the mail in a queue until a designated time and for then initiating the sending of the mail. When "Designate Time" is selected, a "Sending at Designated Time" panel (not shown) pops up for the entry of a desired time. "Keep" is a function for saving the mail in the reception list. When the "Open" of "File" in the menu is selected, the "New Message" window related to the stored mail is re-opened.

Figures 13A, 13B, 13C, 13D, 18:
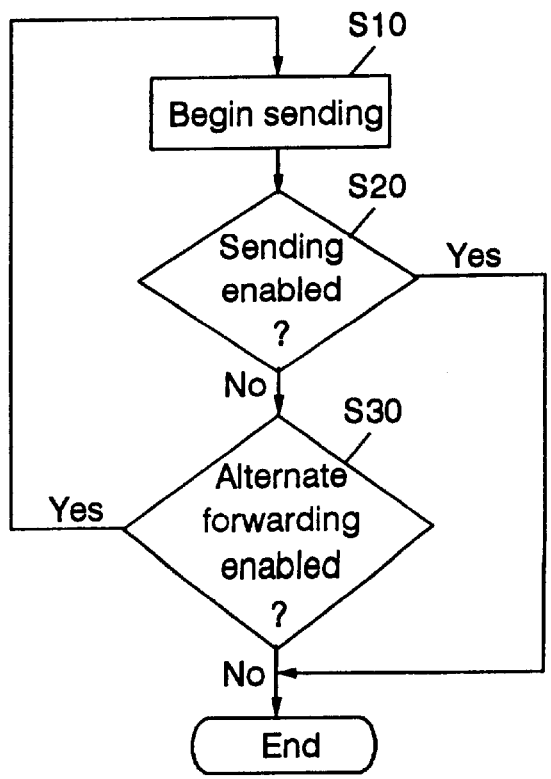
FIGS. 13(a) through (d) are diagrams showing sub-menus for items on the menu bar in the "Address Book" window.
FIG. 18 is a schematic flowchart for the main sending processing performed by the mail service application.

FIG. 18 is a schematic flowchart for the mail sending processing performed by the mail service application. The sending process is begun either when a sender prepares a message and selects the immediate mail sending or the delivery of mail to a sending queue, or when a designated time is reached.

First, the sending of the message to a receiving terminal that is designated in the "Address" field and in the "CC" field is tried (step S10). When the sending process is completed under a predetermined condition, the sending process is thereafter terminated. As was previously described, however, the contents of the "Subject" field are sent only to a MicroClient mounted PHS phone that can handle the contents of this field, not to a pocket bell. The predetermined condition here concerns the elapse of a set period of time following the start of the sending.

When the sending process at step S10 is not completed under the predetermined condition, alternate forwarding to an alternate terminal, which is registered as property belonging to the receiver, is tried (step S20).

If the alternate forwarding is completed under a predetermined condition, the sending process s thereafter terminated. As was previously described, however, the contents in the "Subject" field are sent only to a MicroClient mounted PHS phone that can handle the contents of this field, not to a pocket bell. Also as was previously described, when a message of greater than 100 bytes that is prepared for a MicroClient mounted PHS phone is to be forwarded to an alternate IP pocket bell, data covering only the first 100 bytes in the "Message" field are sent. In addition, when mail prepared for a MicroClient mounted PHS phone or an IP pocket bell is to be forwarded to an alternate NP pocket bell, the contents of the "NP pocket bell alternate message" are sent instead of the contents in the "Message" field. It should be noted that, if the contents in the "Message" field correspond to the reception capability of an NP pocket bell, these data are sent unchanged. When a receiving terminal has only a voice processing function, and does not have a data display function, the PC 10 acting as the data sending apparatus may read the contents of a message and send it as a voice signal.

When the alternate forwarding is not completed under the predetermined condition (steps 30), program control returns to step S10, and sending to the next available receiver is thereafter tried.

It should be fully noted that the above described alternate forwarding is automatically performed by the personal computer 10, which is the sender.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

As is described above in detail and in accordance with the present invention, a superior data sending apparatus having an alternate forwarding function, is provided.

In addition, according to the present invention, a superior data sending apparatus having an alternate forwarding function for the exchange of data by different receiving terminal models is provided.

Furthermore, according to the present invention, a superior data sending apparatus having an alternate seamless forwarding function for the exchange of data by different receiving terminal models is provided.

Further, according to the present invention, a superior data sending apparatus having an alternate seamless forwarding function for the exchange of data by receiving terminal models that have different reception capabilities (reception areas, communication fees, received data processing capabilities, etc.) is provided.

What is claimed is:

1. A system for sending contents of an e-mail message to an external receiving terminal, comprising:

a user interface for inputting contents of the e-mail message and designating a recipient;

a first database for registering address information of respective receiving terminals associated with the designated recipient, wherein the receiving terminals are different types of receiving terminals;

a second database for temporarily storing the contents of the e-mail message;

means for sending, in accordance with the address information stored in said first database, the contents of the e-mail message, to a first of the receiving terminals associated with the designated recipient, wherein the first of the receiving terminals is selected based on the contents of the e-mail message and at least one of a range of service of the first receiving terminal a display size of the first receiving terminal and a communications cost associated with the first receiving terminal;

means for selecting a second of the receiving terminals associated with the designated recipient of a different terminal type from the first of the receiving terminals, wherein the second of the receiving terminals is selected based on the contents of the e-mail message and at least one of a range of service of the first receiving terminal, a display size of the first receiving terminal and a communications cost associated with the first receiving terminal; and alternate means for forwarding the contents of the e-mail message to the second of the receiving terminals associated with the designated recipient if the first of the receiving terminals does not receive the message under predetermined conditions.

2. The system according to claim 1, wherein said first database manages the receiving terminals associated with the designated recipient with a priority queue.

3. The system according to claim 1, wherein said first database further comprises:

a priority queue of respective receiving terminals associated with the designated recipient.

4. The system according to claim 1, wherein the alternate means for forwarding includes means for changing a format for the contents of the message in order to match the specifications of the second of the receiving terminals.

5. The system according to claim 1, wherein the alternate means for forwarding includes means for changing a size of the message in order to match the specifications of the second of the receiving terminals.

6. A system according to claim 1, wherein the first and second databases comprise portions of a single database.

7. A method for sending contents of an e-mail message to a designated recipient having a plurality of receiving terminals associated therewith, comprising the steps of:

(a) registering address information of the plurality of receiving terminals associated with the designated recipient with a first database;

(b) preparing an e-mail message for the designated recipient and storing the contents of the e-mail message in a second database;

(c) sending, in accordance with the address information stored in the first database, the contents of the e-mail message stored in the second database to a first of the receiving terminals associated with the designated recipient, wherein the first of the receiving terminals is selected based on the contents of the e-mail message and at least one of a range of service of the first receiving terminal, a display size of the first receiving terminal and a communications cost associated with the first receiving terminal;

(d) selecting a second of the receiving terminals associated with the designated recipient of a different terminal type from the first of the receiving terminals, wherein the second of the receiving terminals is selected based on the contents of the e-mail message and at least one of a range of service of the second receiving terminal, a display size of the second receiving terminal and a communications cost associated with the second receiving terminal; and (e) if said step of sending fails under a predetermined condition, resending the e-mail message to the second of the receiving terminals associated with the designated recipient.

8. The method of claim 7, wherein said step of sending further comprises:

sending via a priority queue.

9. The method according to claim 7, further including the step of:

changing a format for the contents of the message in order to match specifications of the second of the receiving terminals.

10. The method according to claim 7, further including the step of:

changing a size of the message in order to match specifications of the second of the receiving terminals.

11. A method according to claim 7, wherein the first and second databases comprise portions of a single database.

12. A computer program product recorded on computer readable medium for sending contents of an e-mail message to a designated recipient having a plurality of receiving terminals associated therewith, the computer program product comprising:

(a) computer readable means for registering address information of the plurality of receiving terminals associated with the designated recipient in a first database;

(b) computer readable means for preparing contents of an e-mail message to the designated recipient and storing the contents of the message in a second database;

(c) computer readable means for sending, in accordance with the address information stored in said first database, the contents of the e-mail message stored in the second database to a first of the receiving terminals associated with the intended recipient, wherein the first of the receiving terminals is selected based on the contents of the e-mail message and at least one of a range of service of the first receiving terminal, a display size of the first receiving terminal and a communications cost associated with the first receiving terminal;

(d) computer readable means for selecting a second of the receiving terminals associated with the designated recipient of a different terminal type from the first of the receiving terminals, wherein the second of the receiving terminals is selected based on the contents of the e-mail message and at least one of a range of service of the second receiving terminal, a display size of the second receiving terminal and a communications cost associated with the second receiving terminal; and (e) computer readable means for resending the contents of the e-mail message to the second of the receiving associated with the designated recipient if the computer readable means for sending fails under a predetermined condition.

13. The computer program product of claim 12, further comprising computer readable means for sending via a priority queue.

14. The computer program product of claim 12, further including computer readable means for changing a format for the contents of the message in order to match specifications of the second of the receiving terminals.

15. The computer program product of claim 12, further including computer readable means for changing a size of the message in order to match specifications of the second of the receiving terminals.

16. A computer program product according to claim 12, wherein the first and second databases comprise portions of a single database.

* * * * *